United States Patent [19]

Grimshaw

[11] Patent Number: 4,479,176
[45] Date of Patent: Oct. 23, 1984

[54] ADAPTIVE CONTROL OF A DYNAMIC SYSTEM OR PROCESS

[75] Inventor: Kenneth P. Grimshaw, Christchurch, New Zealand

[73] Assignee: Metalogic Control Limited, Christchurch, New Zealand

[21] Appl. No.: 347,046

[22] Filed: Feb. 8, 1982

[30] Foreign Application Priority Data

Mar. 11, 1981 [NZ] New Zealand .................. 196476

[51] Int. Cl.³ .......................................... G05B 13/02
[52] U.S. Cl. .................................. 364/148; 364/152; 364/166
[58] Field of Search ............. 364/148, 152–159, 364/166, 176, 177, 513; 318/561, 606–608, 621, 622

[56] References Cited

U.S. PATENT DOCUMENTS

| | | | |
|---|---|---|---|
| 3,535,496 | 10/1970 | Bakke | 364/157 |
| 3,622,767 | 11/1971 | Koepcke | 364/152 |
| 3,794,271 | 2/1974 | Barron et al. | 364/152 X |
| 4,232,364 | 11/1980 | Bibbero | 364/152 |

Primary Examiner—Joseph F. Ruggiero
Attorney, Agent, or Firm—Scully, Scott, Murphy & Presser

[57] ABSTRACT

An adaptive control for a dynamic system or process which can be described mathematically as having dominant eigen values and which utilizes the phase response variation with frequency and more precisely uses the rate of change of phase with frequency to measure dynamic characteristics of the system or process and by comparison with known optimum values of rates of change of phase based on a criterion as herein defined determines the changes required to controlled parameters or to a controlling computer in order to achieve and maintain optimum or near optimum performance of the dynamic system or process.

8 Claims, 16 Drawing Figures

A general form of implementation of the Rate of Change of Phase Criterion to the adaptive control of a dynamic system or process.

Fig. 5  A general form of implementation of the Rate of Change of Phase Criterion to the adaptive control of a dynamic system or process.

Fig. 6 Practical implementation II using frequency modulation.

Fig. 7 The adaptive control of the movement of the position of a variable inertia.

Fig. 8  The adaptive control of a 3 mode speed controlled variable inertia.

Fig. 10 The adaptive control of a 3 mode temperature control.

Fig. 11 An arrangement of integrating devices for the 3 mode controller and the adaptive controller for the temperature control system of Fig. 10.

ADAPTIVE CONTROL OF A DYNAMIC SYSTEM OR PROCESS

FIELD OF THE INVENTION

This invention relates to an adaptive control for a dynamic system or process which is defined as one that provides a means of measuring intermittently or continuously the dynamic characteristics of the system or process in terms of a rate of change of phase criterion. The adaptive control can also provide a means of modifying either controlling parameters or a controlling computer of the system or process so that the rate of change of phase requirements desired can be satisfied.

STATEMENT OF PRIOR ART

A number of adaptive control criteria have been used in the past and one of these has been discussed and compared with the present invention in a Confidential Technical Memorandum and in a confidential Report by the applicant, copies of which are submitted herewith for the file, entitled:

TWO GENERAL SOLUTIONS FOR ANY ORDER OF LINEAR DIFFERENTIAL EQUATION

I The ratio of the Rate of Change of Phase to (Modulus)$^2$;

II A Rate of Change of Phase Criterion.

Another adaptive control system known to the applicant is that described in U.S. Pat. No. 3,535,496 (BAKKE). The invention described by BAKKE relates to a closed loop system which includes measuring the energy transmitted in a plurality of selected frequency bands by the entire closed loop system to one of the stated variables. The main distinction between this method of adaptive control and the present invention is the approach adopted. The present invention utilises the rate of change of phase in order to measure the dynamic characteristics and this has significant advantages and is a major departure from the methods of adaptive control adopted previously.

SUMMARY OF THE INVENTION

An object of the present invention is to obtain and maintain optimum or near optimum control of a system or process as herein defined under conditions of large changes in uncontrollable or unknown parameters of the system or process.

The theoretical basis of the present invention has been summarised in a confidential Technical Memorandum dated September 1979 and is more fully explained in a confidential Report No. 31 dated October 1980 to the Electrical Engineering Department, University of Cantebury, New Zealand by the applicant. Both papers are entitled:

TWO GENERAL SOLUTIONS FOR ANY ORDER OF LINEAR DIFFERENTIAL EQUATION

I The Ratio of the Rate of Change of Phase to (Modulus)$^2$;

II A Rate of Change of Phase Criterion.

It has been appreciated that the control of any output variable or quantity of a dynamic system or process can be correlated with its modulus response variation with frequency or with its phase response variation with frequency for superimposed harmonically varying signals of varying frequency. Therefore either the modulus response variation with frequency or the phase response variation with frequency can be used to measure and control the dynamic characteristics of any system or process.

According to the present invention there is provided an adaptive control for a dynamic system or process as herein defined which utilises the phase response variation with frequency and more precisely uses the rate of change of phase with frequency to measure dynamic characteristics of the system or process and by comparison with known optimum values of rates of change of phase based on a criterion as herein defined determines the changes required to controlled parameters or to a controlling computer in order to achieve and maintain optimum or near optimum performance of the dynamic system or process.

The term "dynamic system or process" as used herein means any system or process which can be described mathematically as having dominant eigen values.

The term "rate of change of phase criterion" as used herein means the pertinent design criterion for the adaptive control system as described generally herein.

Further aspects of the present invention which should be considered in all its novel aspects will become apparent from the following descriptions which are given by way of example only.

The present invention relates to any dynamic system or process with input signals of small amplitude which can be represented generally by a linear differential equation of the form $$(c_n D^n + c_{n-1} D^{n-1} + \ldots + c_2 D^2 + c_1 D + c_0)z = y$$

in which D is the differential operator with respect to time z is an output variable of the system or process y is an input variable or function of the system or process $c_0, c_1, c_2 \ldots c_{n-1}, c_n$ are coefficients involving parameters of the system of process and n is an integer defining the order of the differential equation and will vary from system to system or process to process.

The differential equation above can be changed to the normalised from $$(a_n S^n + a_{n-1} S^{n-1} + \ldots a_2 S^2 + a_1 S + a_0)x = y$$

where S can be regarded as the Laplace Transform operator defined in terms of a time ratio variable $t/\tau_0$ where $\tau_0 = \left(\dfrac{C_n}{C_0}\right)^{1/n}$ and $$a_0 = 1; a_1 = \left(\dfrac{1}{\tau_0}\right)\left(\dfrac{C_1}{C_0}\right);$$

$$a_2 = \left(\dfrac{1}{\tau_0}\right)^2\left(\dfrac{C_2}{C_0}\right) \ldots a_n = \left(\dfrac{1}{\tau_0}\right)^n\left(\dfrac{C_n}{C_0}\right) = 1 \text{ and}$$

$$x = C_0 z$$

It is well known that a dynamic system or process defined over its permissible signal range by a linear differential equation of the above form has dynamic characteristics uniquely determined by its eigen values or natural root values obtained from the characteristic equation $$a_n S^n + a_{n-1} S^{n-1} + \ldots + a_2 S^2 + a_1 S + a_0 = 0$$

treated as an algebraic polynominal in S.

In practice for any dynamic system or process that can be described approximately by a linear differential equation of the above form if the parameters of the system change the coefficients $c_0, c_1, c_2 \ldots c_n$ will change and so will the eigenvalues and hence so will be dynamic performance of the system or process. In principle consistency of dynamic performance could be maintained by adjusting controlling parameters or a controlling computer so that the eigenvalues for the normalised form remained fixed. However, in practice this would be very complicated to achieve and as regards providing a practical method for adaptive control it is not attractive and particularly for higher order systems it may not be practicable.

The present invention tackles the adaptive control of a dynamic system or process by a means that is practicable and which for the theoretical explanation can be related to the eigenvalues of the system or process.

The method of the present invention is to control rate of change of phase isoclines of a dynamic system or process so that they are maintained approximately constant at chosen values or within chosen limits. The values depend on the order of the differential equation which may be regarded as approximately defining the dynamic system or process.

BRIEF DESCRIPTION OF THE DRAWINGS

To illustrate the principle underlying the method of the present invention reference should be made to the accompanying drawings in which:

FIG. 6 shows an example of practical implementation of the present invention using frequency modulation to control the dynamic system or process, with FIG. 6 (a) illustrating a harmonic input signal and a time lagged output response therefor, FIG. 6 (b) illustrating the correspondence of phase lag to frequency, and FIG. 6 (c) showing a system for calculating a rate of change of phase at a frequency f;

FIG. 7 shows diagrammatically an example of adaptive control of the movement of position of a variable inertia with FIG. 7 (a) showing an embodiment of the present invention for the controlled movement of a variable inertia load, and FIG. 7 (b) illustrating the transfer functions for the relationships of the essential design parameters of the system of FIG. 7 (a);

FIG. 8 shows diagrammatically an example of adaptive control of a 3 mode speed controlled variable inertia with FIG. 8 (a) illustrating an embodiment of the present invention for controlling the speed of a variable inertia load, and FIG. 8 (b) illustrating the transfer functions for the relationships of the essential design parameters of the system of FIG. 8 (a);

FIG. 10 shows diagrammatically the adaptive control of a 3 mode temperature control system with FIG. 10 (a) illustrating an embodiment of the present invention for controlling a three mode temperature control system, and FIG. 10 (b) illustrating the transfer function relationships of the system of FIG. 10 (a)

DESCRIPTION OF PREFERRED EXAMPLES

Figure 1:
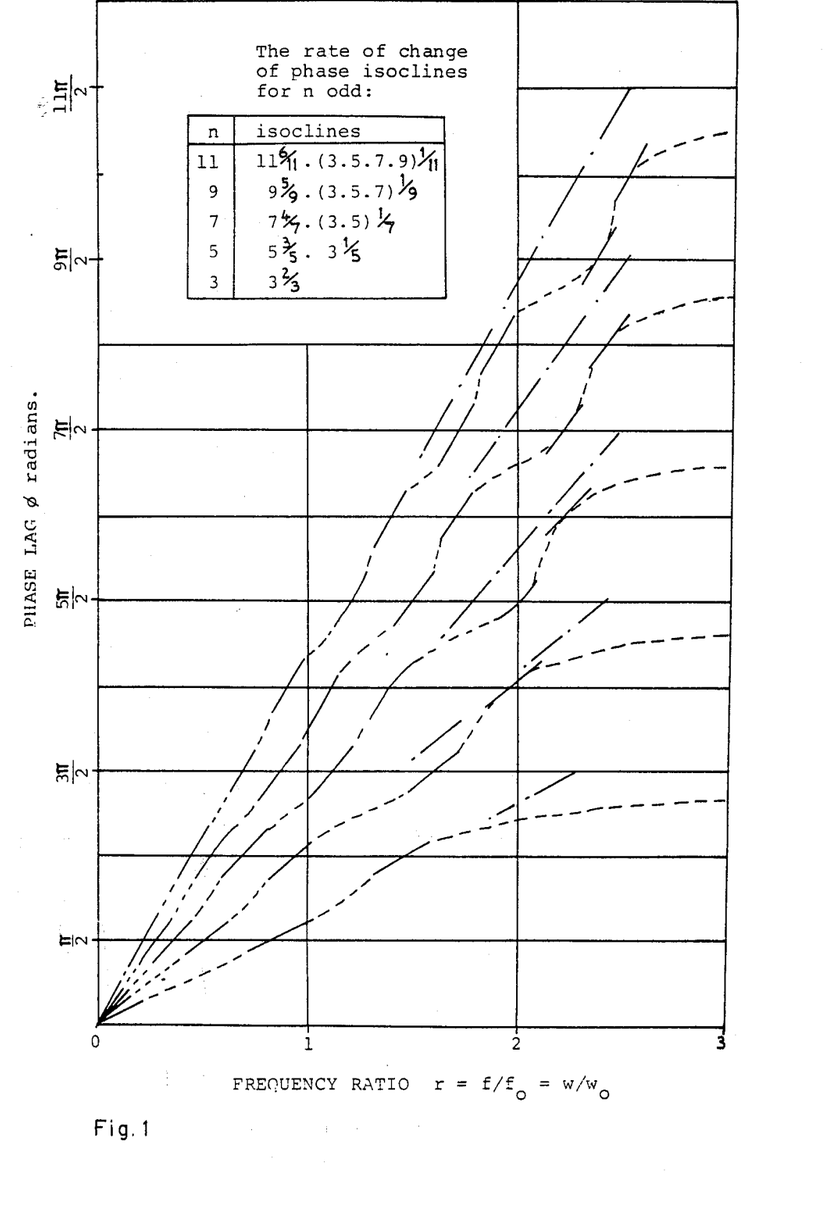
FIG. 1 shows the isoclines for n (odd) 3 to 11 system.
Figure 2:
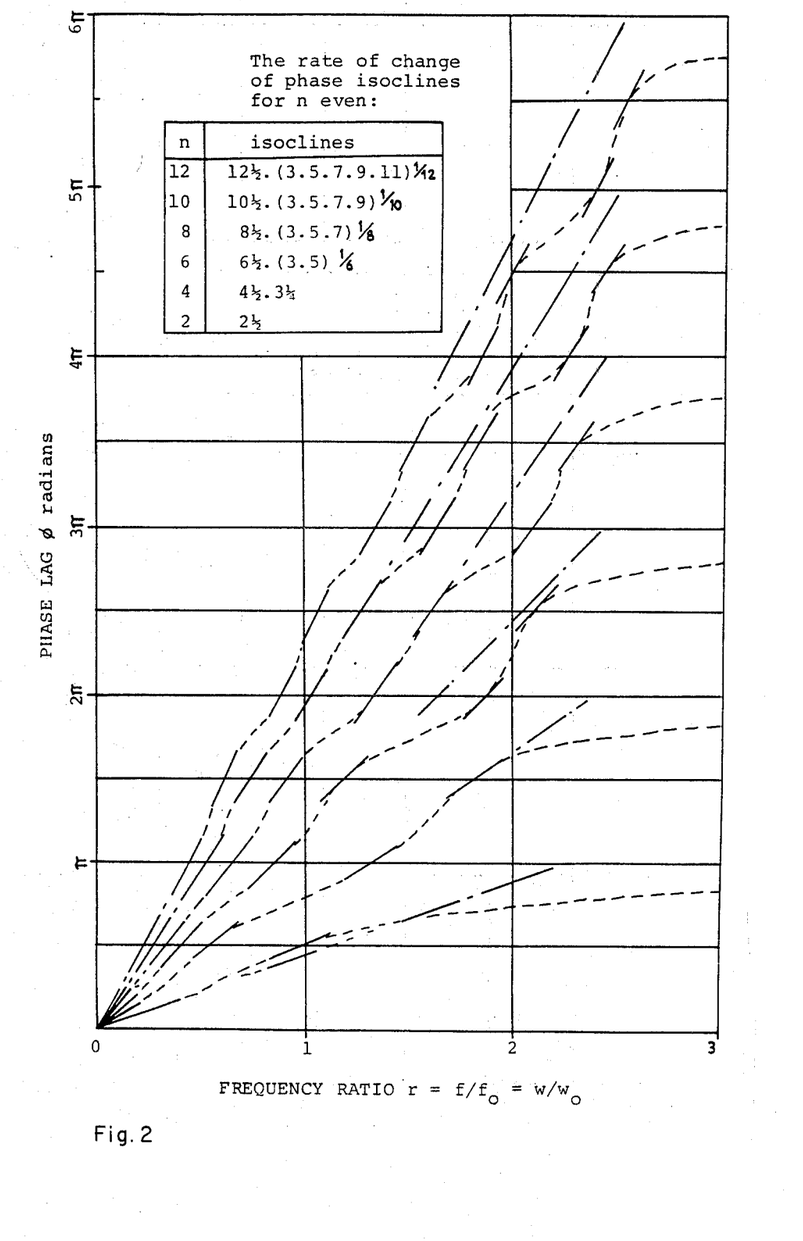
FIG. 2 shows the isoclines for an n (even) 2 to 12 system.

As stated FIGS. 1 and 2 show the isoclines for n (odd) 3 to 11 and for n (even) 2 to 12 respectively.

Figure 3:
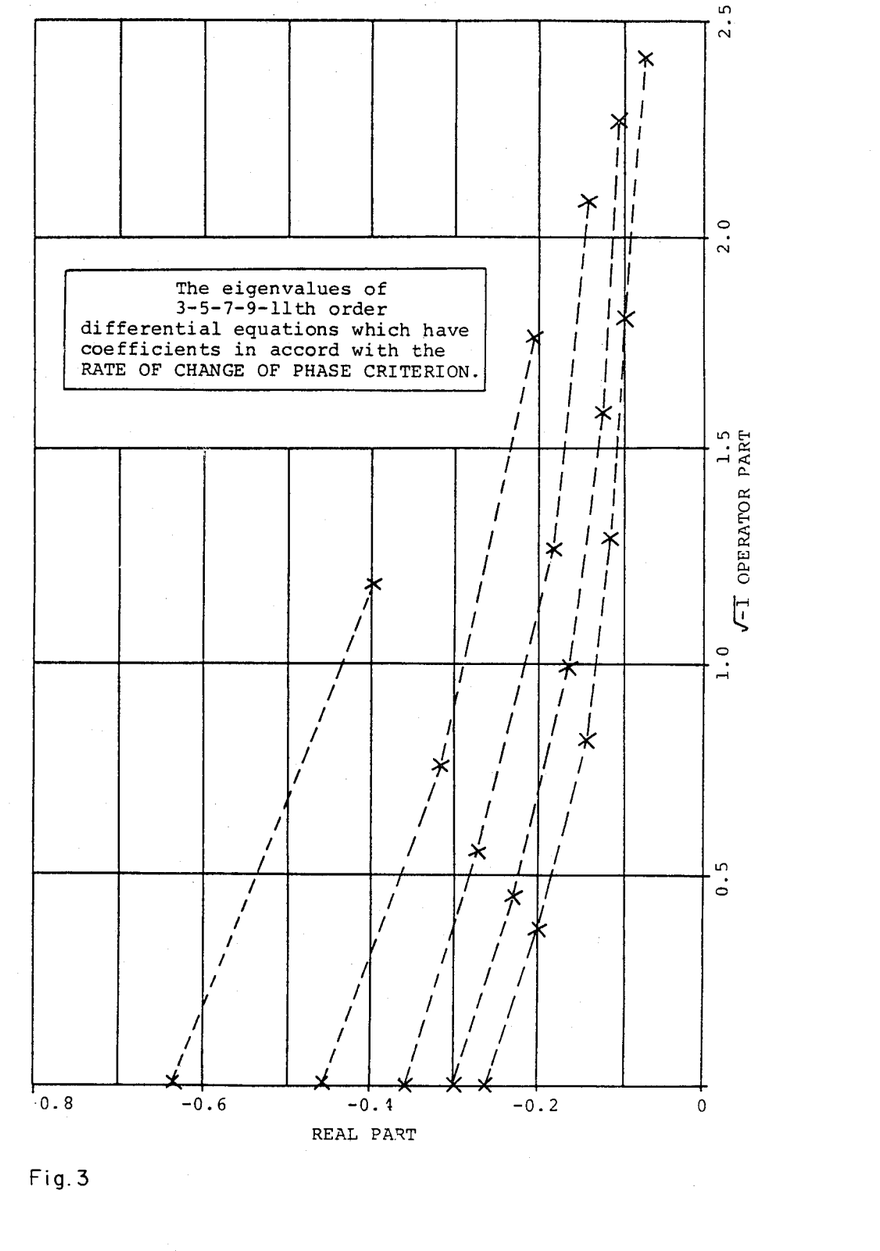
FIG. 3 shows the eigen values plotted on a complex plane corresponding to the isoclines shown in FIG. 1.
Figure 4:
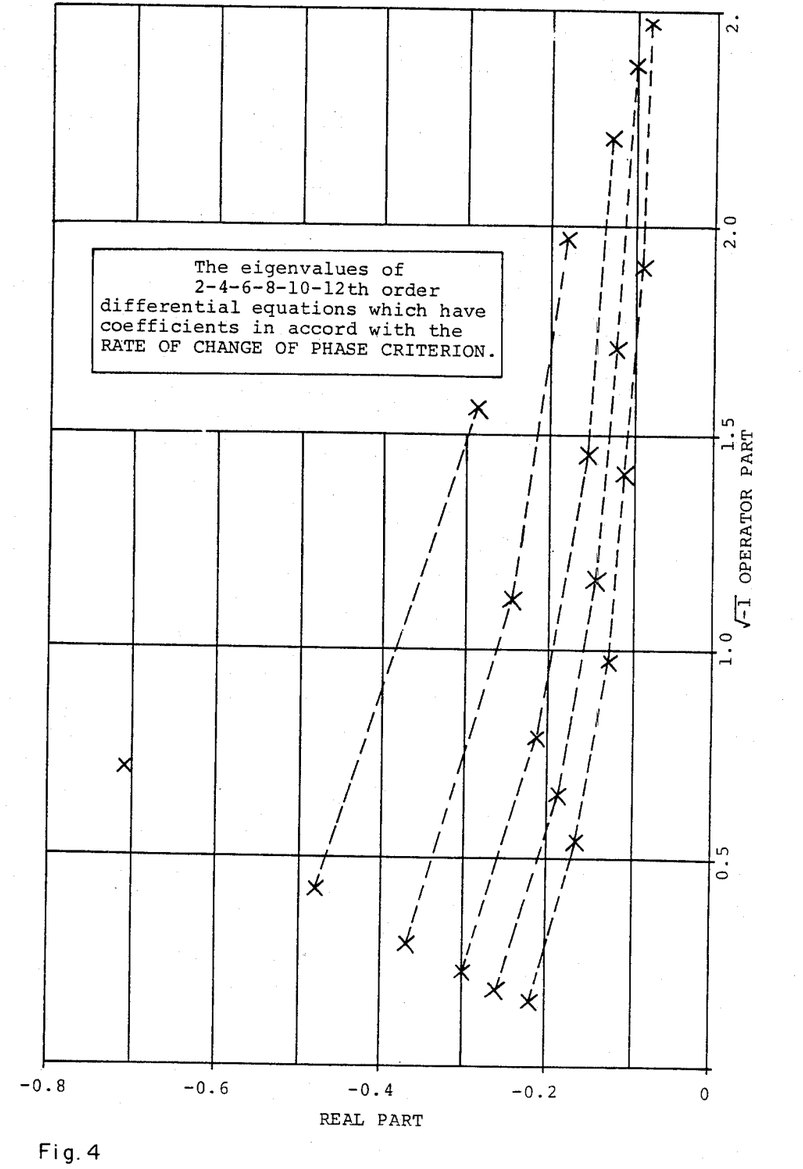
FIG. 4 shows the eigen values plotted on a complex plane corresponding to the isoclines shown in FIG. 2.

In FIGS. 3 and 4 the corresponding eigenvalues are plotted on the complex plane for n (odd) 3 to 11 and for n (even) 2 to 12 respectively. As already stated the improved method for the invention is that it provides a practicable means of measuring and controlling the rate of change of phase isoclines rather than attempting the more difficult task of controlling directly the locations of the eigenvalues.

An nth order dynamic system or process has n eigenvalues and as shown in FIGS. 1 and 2 the rate of change of phase criterion has n isoclines. In applying the criterion to a dynamic system or process it has to be recognised that there may not be available a sufficient number of independently controllable parameters to ensure exact equality of all the isoclines throughout the whole range of frequency. In practice this will mean that using the criterion as an indication and a guide of the optimum response attainable that fewer than n rates of change of phase will be required to be controlled to obtain an adaptive control of the system or process that is near enough to an optimum. Furthermore although large changes of some parameters of a system or process can occur there will be some parameters that do not change significantly which will generally ease the task of adaptively controlling the system or process. In application therefore although the criterion is based on ensuring that an nth order system have n rate of change of phase isoclines occurring every quarter cycle of phase change with frequency in practice the adaptive control of a system or process using the criterion can often be satisfactorily achieved using less than the maximum number of isoclines.

The isoclines of the rates of change of phase with frequency shown in FIGS. 1 and 2 are the result of fulfilling the following conditions, which define the rate of change of phase requirements of the criterion.

The transfer function corresponding to the linear differential equation given above may be expressed as $$\frac{Z}{y} = \frac{1}{A + jB}$$

where j is the complex operator $\sqrt{-1}$ and $$A = c_0 - c_2\omega^2 + c_4\omega^4 - c_6\omega^6 + \ldots$$

$$B = c_1\omega - c_3\omega^3 + c_5\omega^5 - c_7\omega^7 + \ldots$$

and $\omega$ is the angular frequency in radians per second.

The phase lag $\phi$ of Z relative to Y and the modulus $M = |z/y|$ are then given by $$\phi = \tan^{-1}\left(\frac{B}{A}\right) \text{ and } M = \frac{1}{\sqrt{A^2 + B^2}}$$

putting $F(\phi) = \tan\phi = B/A$ and differentiating gives $$\frac{d\phi}{d\omega} = \frac{(dF/d\omega)}{(dF/d\phi)} =$$

$$\left[\frac{A(dB/d\omega) - B(dA/d\omega)}{A^2}\right] \div \left[\frac{1}{\cos^2\phi}\right]$$

which simplifies to $$\frac{(d\phi/d\omega)}{M^2} = A(dB/d\omega) - B(dA/d\omega).$$

when $\phi = 0, \pi/2, 2(\pi/2) \ldots (n-1)\pi/2$ this relationship simplifies further to the following:

When $\phi = 0$, $(d\phi/d\omega)_{\omega \to 0} = \frac{C_1}{C_0}$ \hfill (1)

When $\phi = \pi/2, 3(\pi/2), 5(\pi/2) \ldots$ then $A = 0, M = \frac{1}{B}$ and $\left(\frac{d\phi}{d\omega}\right) = -\frac{\left(\frac{dA}{d\omega}\right)}{B}$ \hfill (2)

When $\phi = \pi, 2\pi, 3\pi \ldots$ then $B = 0, M = \frac{1}{A}$ and $\left(\frac{d\phi}{d\omega}\right) = \frac{\frac{dB}{d\omega}}{A}$ \hfill (3)

The rate of change of phase criterion as defined is based on making the rates of change of phase with respect to angular frequency and corresponding to (1), (2) and (3) equal and thereby obtaining the isoclines of FIGS. 1 and 2.

Figure 5:
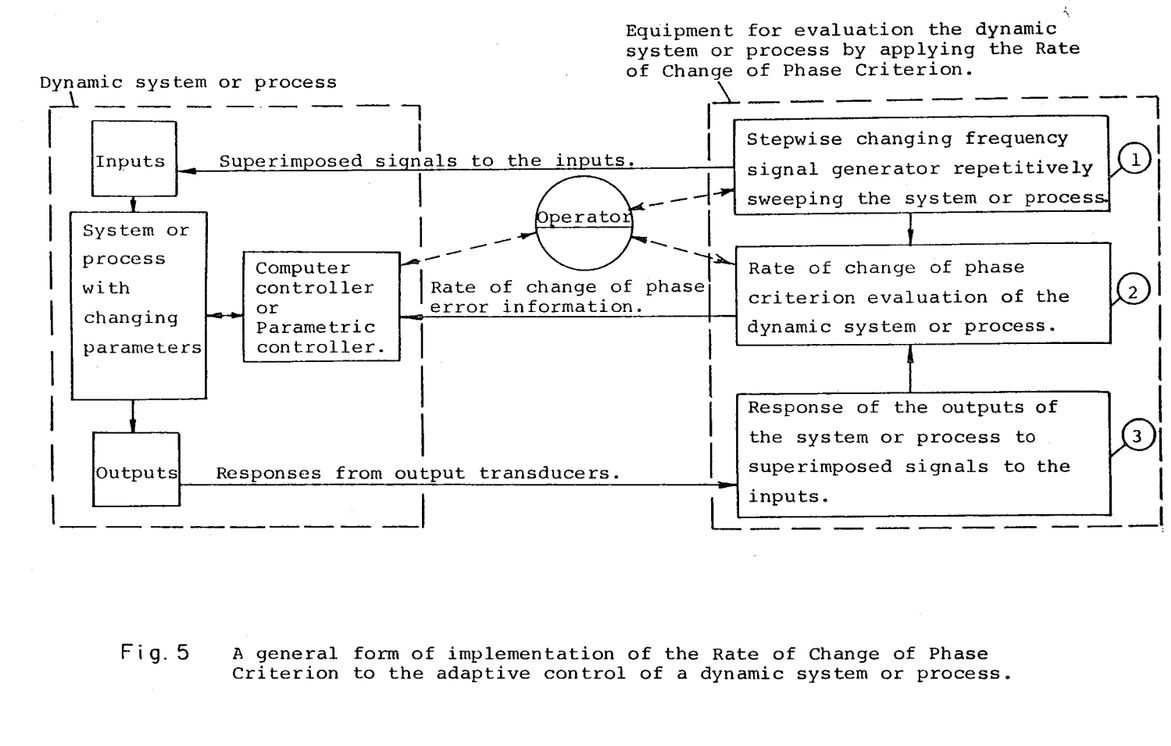
FIG. 5 shows diagrammatically a general form for implementing the invention for a supervisory adaptive control of a dynamic system or process.

By way of example a general form of implementation is shown in FIG. 5 of the accompanying drawings which shows a general form of implementation of the invention for the supervisory adaptive control of a dynamic system or process with a human operator who can intervene in the control of the system or process.

Without the human operator FIG. 5 also represents what can be termed direct adaptive control that is one in which the adaptive requirements are carried out automatically without intervention from a human operator.

The practical means of implementing the adaptive control of a system of process by applying the rate of change of phase criterion that is the practical implementation of the functional blocks 1, 2 and 3 indicated in FIG. 5 is the particular concern of the invention. Practical methods of implementation will be explained with reference to FIGS. 6 to 11.

It is to be understood that the merits of the invention and the practical implementations described below lie not so much with the individual components comprising the functions indicated by the blocks 1, 2 and 3 of FIG. 5 but with the practical way they are combined to obtain the rate of change of phase errors for the adaptive control of a system of process. For example the components to perform the controlling logic or calculations for the evaluation of the rate of change of phase errors can be electrical of electro-mechanical or mechanical or fluid or other type or a combination of these and can operate digitally or in continuous analogue or in hybrid form. Or the functions can be partly or wholly incorporated into the composite functional form of an electronic microprocessor or a computer. For the purposes of describing the practical implementations that follow it is convenient to regard them as made up of separate interconnected component parts.

EXAMPLE I

As shown in FIG. 5 this uses a stepwise changing frequency signal generator repetitively either continuously or intermittently sweeping the system over a chosen time and suitable chosen frequency range of harmonic signals superimposed on the dynamic system or process to be adaptively controlled. The practical form of the Signal to the system or process can be electrical, mechanical, fluid, thermal or other chosen to suit the system or process and the amplitude arranged to be within permissible perturbation levels for the system or process.

The first requirement is to determine the order n of the system or process from measurement of the total phase shift and hence choose a suitable reference value of phase variation rate in accord with the rate of change of phase criterion.

By suitable logic control and calculation the following steps would be implemented for each frequency sweep of the system or process:

1. On each frequency step determine the ratio y/z of the harmonic signal y and output response z and separate the ratio into its complex component parts A and jB.
2. As the frequency sweep is carried out on each step store the complex component parts A and jB.
3. From the stored information of the complex component parts derive and also store the rates of change $(dA/d\omega)$ and $(dB/d\omega)$ 4. For the lowest frequency signal the ratio will give approximately the initial phase variation rate $(B/\omega A)$ $\omega \to 0$ and adjustment of the parametric controller or the computer controlling the system or process should be made so that this value agrees closely with the value required in accord with the rate of change of phase criterion.
5. From steps 2 and 3 when $A = 0$ the ratio $-(dA/d\omega)/B$ may be obtained and likewise when $B = 0$ the ratio $(dB/d\omega)/A$
6. By comparing each of the ratios in 4 and 5 with the chosen reference value of the criterion the rate of change of phase errors will be obtained and used to modify the computer controller or the parametric controller of the dynamic system or process to reduce the rate of phase errors and to keep them within permissible levels as the frequency sweep is repeated.

The first method of practical implementation is evidently a direct application of the relationships defining the rate of change of phase criterion.

EXAMPLE II

Figure 6A:
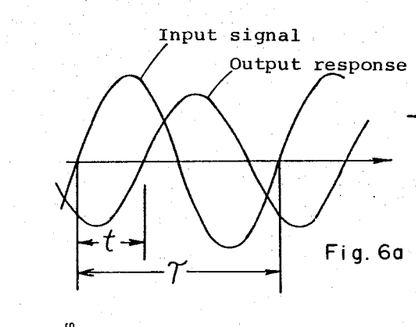

This uses frequency modulation techniques. Referring to FIG. 6 (a) of the accompanying drawings for any harmonic signal to the input of the system or process the frequency $f=(1/\tau)$ Hz where $\tau$ is the period of the signal in seconds. The time lag of the output response relative to the input signal will then be given by $t+k\tau=\tau(\phi/2\pi)$ where K is either zero or a whole number and $\phi$ is the phase lag of the output response in radians relative to the input signal.

By use of a pulse generator providing P pulses per second together with logic control and a counter the number of pulses in time intervals t and $\tau$ namely n and N respectively can be determined.

Hence $t=n/p$ and $\tau=N/P$

Also $\phi/2\pi=t/\tau+K=n/N+K$ where K is an integer equal to the whole number of cycles of $2\pi$ in $\phi$.

Figure 6B:
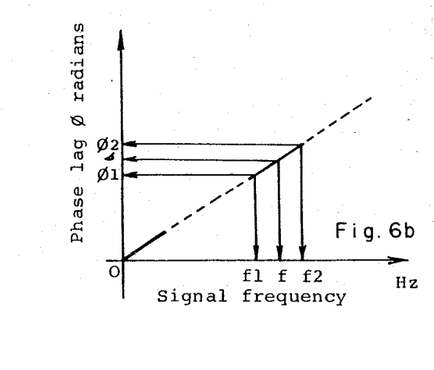

Hence, corresponding to the frequency f of FIG. 6 (b) of the accompanying drawings the phase lag $\phi$ is given by $$\phi = 2\pi(n/N+K) \text{ radians}$$

Figure 6C:
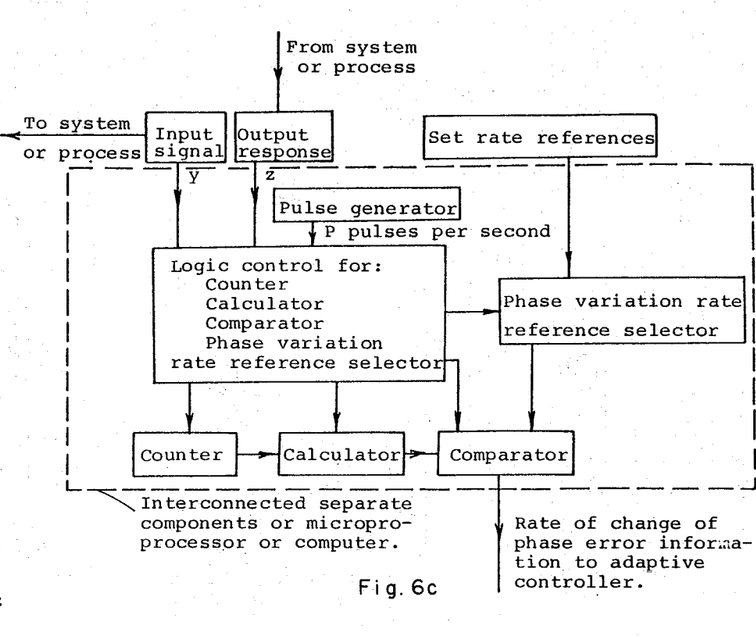

By measuring in this way the values of phase lags $\phi_2$ and $\phi_1$ for step modulation changes $\pm\Delta f$ of the frequency f giving $f_2=f+\Delta f$ and $f_1=f-\Delta f$ obtaining the corresponding counts $n_2$, $N_2$ and $n_1$, $N_1$ the average rate of change of phase at frequency f will be given by

$$\frac{\phi_2 - \phi_1}{f_2 - f_1} = \frac{2\pi\left(\frac{n_2}{N_2} - \frac{n_1}{N_1}\right)}{P\left(\frac{1}{N_2} - \frac{1}{N_1}\right)} = \frac{2\pi}{P}\left(\frac{N_1 n_2 - N_2 n_1}{N_1 - N_2}\right)$$

which may be evaluated and stored in the calculator in FIG. 6 (c) of the accompanying drawings and compared with a phase variation rate reference value of the criterion.

By suitable logic control the phase variation rates are determined either every quarter cycle of phase shift or at selected frequency values and compared with phase variation values chosen from the criterion. By this means the phase variation rate errors are obtained and used as indicated in FIG. 5 adaptively to control the response of the dynamic system or process.

EXAMPLE III

The practical implementations I and II have both been described assuming harmonic signal wave forms but in some cases other wave forms may be used such as a square wave form signal as shown below It is well known due to Fourier circa 1807 that any periodic wave form can be regarded as being made up of harmonic components. For the square wave form signal shown, these are:

$$\frac{4}{\pi} \cdot F \sin\left(\frac{2\pi t}{\tau}\right) \text{ 1st harmonic}$$

-continued $$\frac{4}{\pi} \cdot \frac{F}{3} \sin 3\left(\frac{2\pi t}{\tau}\right) \text{ 3rd harmonic}$$

$$\frac{4}{\pi} \cdot \frac{F}{5} \sin 5\left(\frac{2\pi t}{\tau}\right) \text{ 5th harmonic}$$

etc.

in other words a square wave form signal such as shown can be regarded as the equivalent of simultaneous harmonic signals of frequency $f=1/\tau$, 3f, 5f, etc. of decreasing amplitude.

When such a square wave form signal is applied to a system or process the output will contain phase change information of the harmonic components of the input. By extracting this information using harmonic discrimination and by using two such square wave form signals in succession, of first harmonic frequency values $f_1=f+\Delta f=1/\tau$ and $f_2=f-\Delta f=1/\tau_2$ the rate of change of phase values corresponding to frequencies f, 3f, 5f, can be obtained simultaneously. By comparing these values with reference values of the rate of change of phase criterion the rate of change of phase errors for f, 3f, 5f, can be obtained and used as in the previous two methods of practical implementation to adjust the control of the dynamic system or process.

In the practical examples II and III the rate of phase values can be obtained for phase shifts other than every quarter cycle. In these cases the phase variation rates used as references can have values slightly different from the isocline value for the appropriate n value of the system or process but would still be chosen to correspond to the phase variation rate derived from the rate of change of phase characteristic of the criterion.

EXAMPLE IV

This exemplifies an application to the controlled movement of the position of a variable load inertia.

Figure 7A:
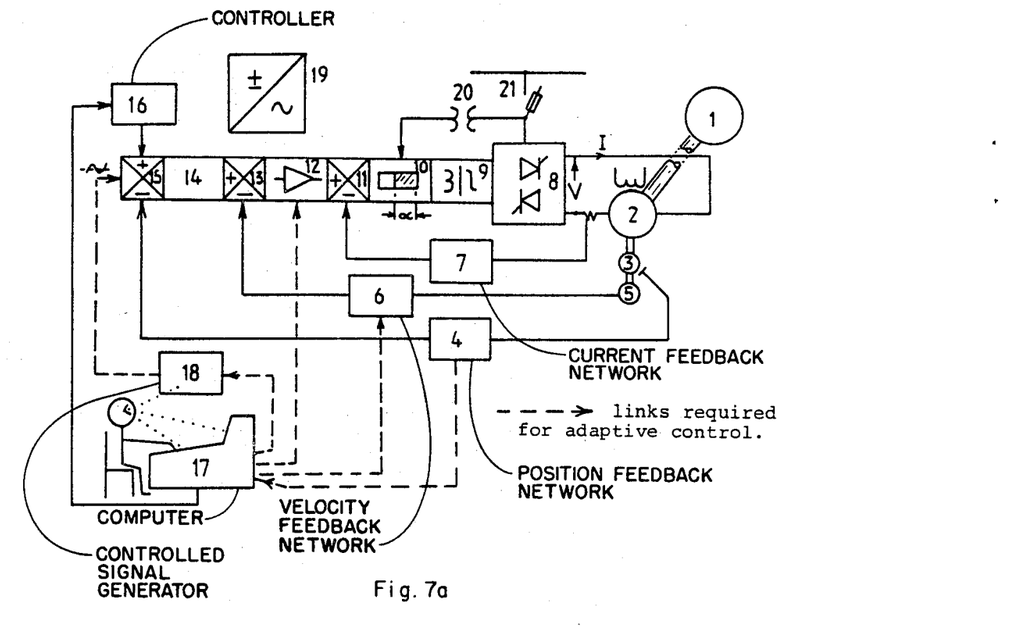

Referring to FIG. 7 (a) of the accompanying drawings a direct current motor 2 is mechanically coupled to a variable load inertia 1. The torque of the motor accelerating or braking is determined by the mean voltage V providing the current I and is controlled by the rectifier/inverter 8 by means of the pulse and phase angle $\alpha$ control circuits 9 and 10 respectively.

A current feedback network 7 is provided with a twofold purpose: to limit the current and torque of the motor and to reduce the small inductive time lag constant of the armature circuit of the motor so that it is negligible compared to the variable time lag parameter of the combined inertia of the motor armature and load.

A summation unit 11 and an amplifier 12 provide gain control between the positional error at the summation unit 15 and the torque control of the motor 2.

Accurate control of the position of the combined motor armature and the load inertia is provided by a transducer 3 feeding back via network 4 and balancing the measured position in the summation unit 15 against the position prescribed by the controller 16 the difference in error being modified and filtered as desirable by network 14 before being transmitted via summation unit 13 to the gain control amplifier 12.

Dynamic control to satisfy the requirements of the criterion is provided by the velocity transducer 5 and network 6 designed to give controlled velocity and derivative velocity feedback components to the summation unit 13.

Monitoring of the rate of change of phase required to apply the criterion is provided by the computer controller 17 via the controlled signal generator 18 and the positional feedback network 4.

Adaptive control to satisfy the rate of change of phase requirements of the criterion is then provided by means of controlling the gain of the amplifier 12 and the velocity and derivative of velocity feedback components of the network 6.

Power supply provision is indicated by 19, 20 and 21.

Figure 7B:
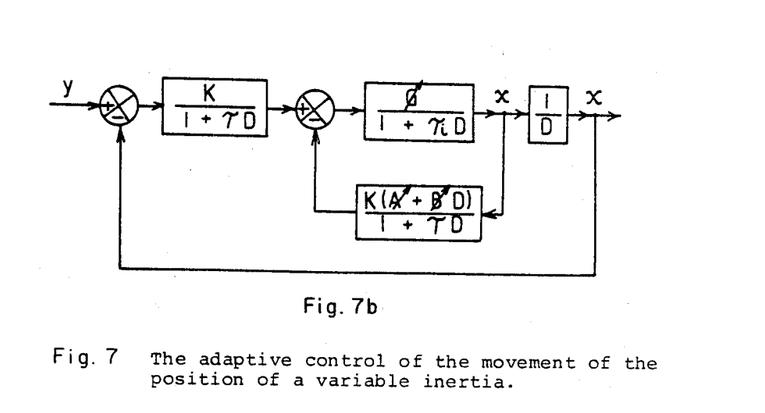

The adaptive control features will be more completely understood by referring to FIG. 7(b) of the accompanying drawings which shows the scheme of dependence relating to essential design parameters of the practical system of FIG. 7(a) described above.

The parameter y is the input displacement prescribed by the controller 16 and computer 17.

x and $\dot{x}$ are the displacement and velocity respectively of the combined inertia of the motor armature and the load.

$\tau_i$ is the time lag parameter of the combined inertia of the motor and the load. It is proportional to the product of the combined inertia and the sum of the armature circuit resistance and equivalent resistance effect of the current feedback.

Due to the variable load inertia its value can vary widely and the purpose of the adaptive control is to ensure optimum and invariable dynamic performance of the position control as $\tau_i$ varies.

The time lag constants $\tau$ are provided for filtering and also in the case of the feedback transfer function parameter to limit the maximum impulse effect of this dynamic control feedback component.

The parameters K are constant gain parameters.

The parameter G is a controlled gain provided by amplifier 12.

A and B represent the controlled velocity and derivative of velocity feedback parameters respectively in network 6.

D represents the differential operator with respect to time.

The normalised transfer function corresponding to the scheme of dependence of FIG. 7(b) is $$\frac{x}{y} = \frac{1}{1 + a_1 s + a_2 s^2 + s^3}$$

s being the Laplace Transform operator (see page 4 line 19 to 26).

In the present example $$\tau_0 = \left(\frac{\tau \tau_i}{KG}\right)^{\frac{1}{3}}$$

and to satisfy the rate of change of phase criterion $$a_1 = \left(A + \frac{1}{KG}\right)\left(\frac{KG}{\tau \tau_i}\right)^{\frac{1}{3}} = 3^{\frac{2}{3}}$$

$$a_2 = \left(B + \frac{\tau + \tau_i}{KG}\right)\left(\frac{KG}{\tau \tau_i}\right)^{\frac{2}{3}} = 3^{\frac{1}{3}}$$

$\tau$ and K would be designed to have suitable constant values.

As the inertia time lag parameter $\tau_i$ varied, the controlled gain parameter G, the velocity feedback parameter A and the derivative of the velocity parameter B would be adjusted to preserve the isocline conditions of the criterion as determined from rate of change of phase measurements such as described in examples I, II or III.

EXAMPLE V

FIG. 8 of the accompanying drawings shows an application to the control of the speed of a variable inertia incorporating a widely used form of control known as 3 mode control because it uses three error modifying terms namely proportional integral and derivative of error.

The purpose of 3 mode control is to obtain an acceptable dynamic response with zero steady state error. The resetting to zero after a disturbance is due to the inclusion of the integral of the error term and the time constant $\tau_r$ to obtain it is commonly referred to as the reset or integral time constant.

The addition of the derivative of error of time constant $\tau_d$ is to improve the transient response and reduce the time to reset to zero error.

The application of the invention to the adaptive control of a 3 mode control of the speed of a variable inertia will now be explained.

Figure 8A:
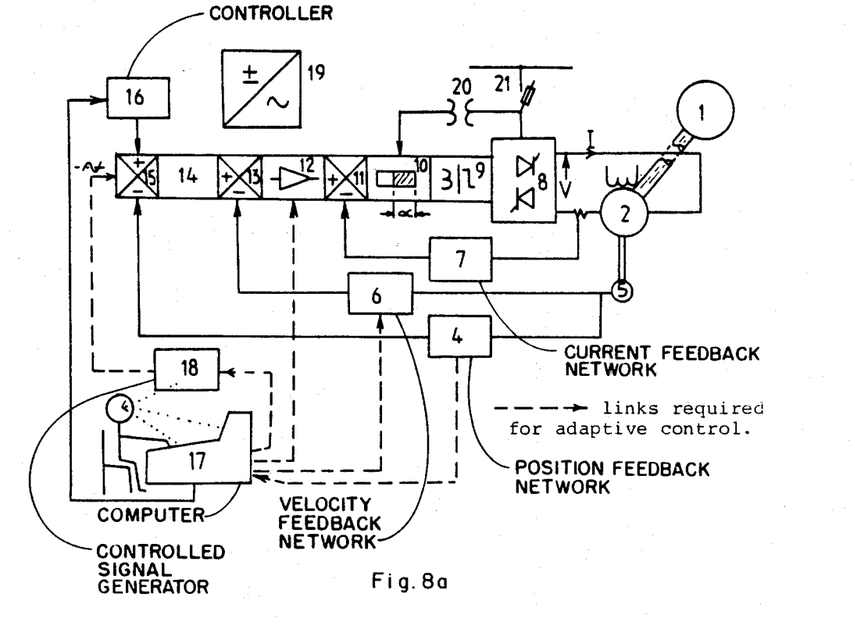

Referring to FIG. 8(a) the main components of FIG. 7(a) of Example IV are reproduced except that the feedback of position is omitted and is replaced by the feedback via network 4 of the speed obtained from the velocity transducer 5.

Control of the speed of the combined motor armature and load inertia is provided by balancing the measured speed in the summation unit 15 against the speed prescribed by the controller 16 the difference or error then being modified by the 3 mode control network 14 before transmission via the summation unit 13 to the gain controlling amplifier 12.

Figure 8B:
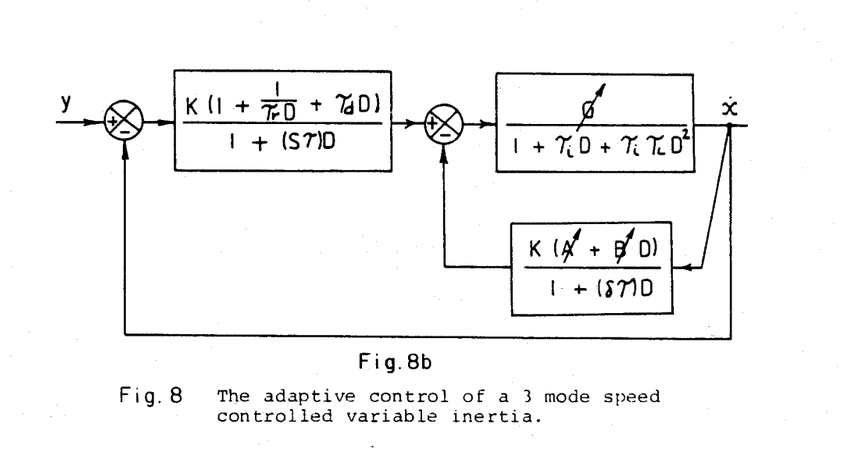

The adaptive control features will be more completely understood by referring to FIG. 8(b) which shows the scheme of dependence relating the essential design parameters of the practical system of FIG. 8(a).

The input Y is the velocity prescribed by the controller 16 and computer 17; and $\dot{\chi}$ is the actual velocity of the combined inertia of the motor armature and the load as measured by the transducer 5.

$\tau_i$ is the variable time lag parameter of the combined inertia of the motor and the load as defined in example IV.

$\tau_L$ is the inductive time constant of the armature circuit which is included in this example.

The gain parameter K, the reset time constant $\tau_r$, the derivative time constant $\tau_d$ and the small time lag constant $\delta \tau$ of the 3 mode network 14 would all be designed to have suitable constant values.

The same gain parameter K and the same small time lag constant $\delta \tau$ can also be used in the adaptive feedback network 6.

The A and B parameters of this network, together with the torque control gain parameter G controlled by amplifier 12, provide the required adaptive controls to satisfy the criterion.

The reset term of the 3 mode controller raises the order of the system from a quadratic for the motor and load speed control to a 3rd order system.

To meet the eigen value requirements of the criterion the conditions to be satisfied are:

$$a_1 = \tau_r \left[ A + 1 + \frac{1}{KG} \right] / \tau_o = 3^{\frac{1}{3}}$$

$$a_2 = \tau_r \left[ B + \tau_d + \frac{\tau_i + \delta\tau}{KG} \right] / \tau_o^2 = 3^{\frac{1}{3}}$$

$$\text{where } \tau_o = \left[ \frac{\tau_r \tau_i (\tau_L + \delta\tau)}{KG} \right]^{\frac{1}{3}}$$

The inclusion of the small time lag constant $\delta\tau$ is a desirable design feature to limit the maximum impulse effects due to the derivative terms $\tau_d$ and B in the 3 mode control network and the adaptive control network respectively.

The small time lag constant $\delta\tau$ raises the order of the system to 4th order but is designed to be small enough that the eigen values are practically those of a 3rd order system the remaining 4th root being so remote as not to affect the application of the criterion to the system treated as 3rd order.

The use of a 3 mode control network requires that cognisance be taken of two additional features in the application of the criterion. Both of these features arise from the form of the overall transfer function, which in the normalised form, neglecting the very small fourth order term referred to above can be written $$\frac{\dot{x}}{y} = \frac{1 + b_1 s + b_2 s^2}{1 + a_1 s + a_2 s^2 + s^3}$$

in which $a_1$ and $a_2$ are parametric coefficients of the criterion and the numerator terms $$b_1 = \frac{\tau_r}{\tau_o} \quad \text{and} \quad b_2 = b_1 \left( \frac{\tau_d}{\tau_o} \right)$$

arise from the use of the 3 mode control.

These terms $b_1$ and $b_2$ require to be chosen and fixed to have constant values, by suitable choice of $\tau_o$, $\tau_r$ and $\tau_d$.

Figure 9:
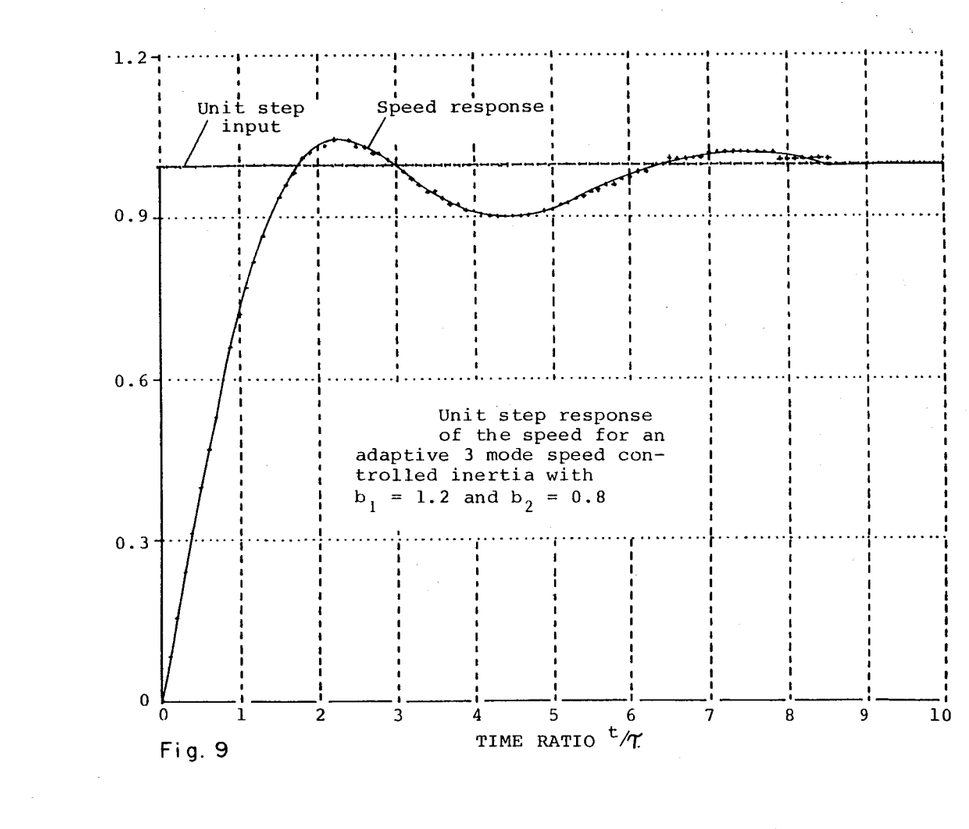
FIG. 9 shows a graph of unit step response of speed for an adaptive 3 mode speed controlled inertia.

In the present case a suitable value of $b_1$ and $b_2$ would be $b_1 \simeq 1.2$ and $b_2 \simeq 0.8 \pm 0.1$ and would result in the normalised step response shown in FIG. 9 of the accompanying drawings. But other values can be chosen giving greater or less overshoot and correspondingly slightly different responses for the same eigen values (controlled by the criterion) as desired by the designer.

The second feature also arises from the presence of the numerator function $1 + b_1 S + b_2 S^2$ and has to be allowed for when monitoring the phase and the rate of change of phase of the characteristic equation in order to apply the criterion.

Thus, the overall phase and rate of change of phase of the system will include not only the effect of the characteristic equation but also that of the above numerator function.

As explained above in any application the $b_1$ and $b_2$ terms of the 3 mode control network would be fixed by the designer. Hence at every frequency both the phase and the rate of change of phase for this numerator function are known and can be allowed for in the overall phase and rate of change of phase measurements of the system.

By this means the correct phase and rate of change of phase measurements for the characteristic equation can be monitored and the parameters G, A and B changed adaptively to maintain the eigen values located in accord with the rate of change of phase criterion values.

EXAMPLE VI

This example will exemplify an application of the invention to a higher order system namely the adaptive control of the 3 mode temperature controlled system of FIG. 10 of the accompanying drawings.

Figure 10A:
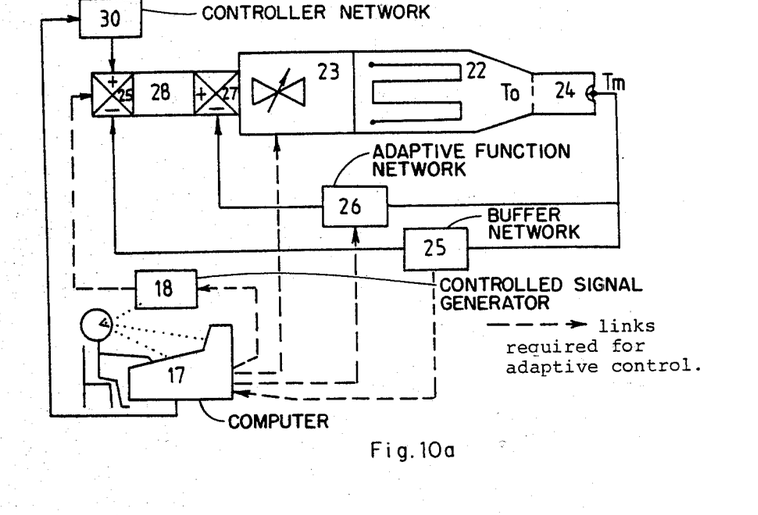

Referring to FIG. 10(a) 22 represents a heat exchanger supplied from a valve controlled heat source 23.

The object of the control is to ensure that the temperature $T_o$ of the medium or material heated by the heat exchanger has a value within desired limits of that prescribed by the input reference from network 30.

To achieve this a temperature transducer, or transducers measures the average output temperature $T_o$ from the heat exchanger and this value $T_m$ is balanced against the prescribed value in the summation device 29

Network 28 provides 3 mode control and network 26 the adaptive control to meet the requirements of the criterion.

Figure 10B:
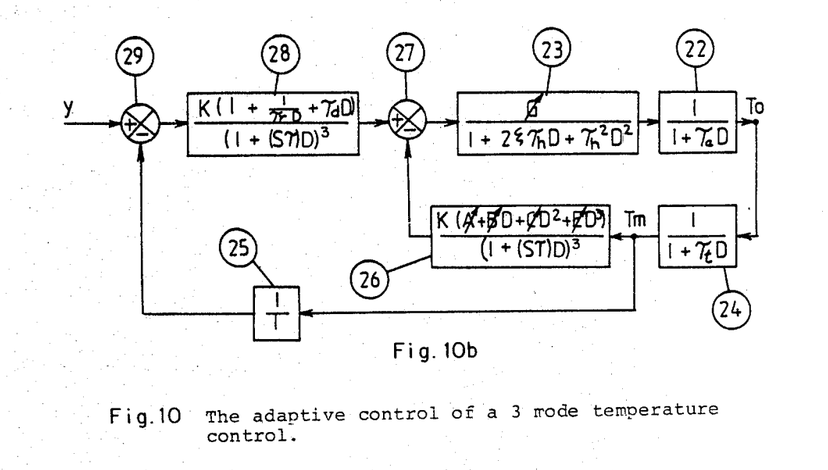

The scheme of dependence in FIG. 10(b) shows the essential transfer function relationships. Transfer function 22 represents the time lag effect $\tau_e$ of the heat exchanger, 23 the transfer function of the heating valve position controlled by a gain term G, 24 the time lag effect of the temperature transducer, 28 is the 3 mode controller and 26 is the adaptive control function network.

The binomial filter terms $(1+\delta\tau)^2$ in the adaptive control function are included to limit the maximum impulse magnitude due to the highest order derivative term $ED^3$. It is advantageous to include the same binomial terms in the 3 mode controller.

The orders of the valve position control, the heat exchanger, and the temperature transducer combine to make a 4th order system. The integral term of the 3 mode controller increases the order of the system overall by one to make a fifth order system.

This fifth order system is then controlled to meet the requirements of the criterion by the five parameters G, A, B, C and E as follows.

$\tau_o$ is maintained at its chosen value by control of G; and the parametric coefficients $a_1$, $a_2$, $a_3$ and $a_4$ for a fifth order system at the values required as below $a_1 = 5^{3/5} \cdot 3^{1/5}$ by control of A $a_2 = 2 \cdot 5^{1/5} \cdot 3^{2/5}$ by control of B $a_3 = 2 \cdot 5^{4/5} \cdot 3^{3/5}$ by control of C $a_4 = 5^{2/5} \cdot 3^{-1/5}$ by control of E The third order binomial filter increases the order of the system from 5th order to 8th order so that the normalised characteristic equation has the form $$1 a_1 S + a_2 S^2 + a_3 S^3 + a_4 S^4 + S^5 + \delta_6 S^6 + \delta_7 S^7 + \delta_8 S^8 = 0$$

By suitable choice of a small time constant $\delta\tau$ of the binomial filter the coefficients $\delta_6$, $\delta_7$, $\delta_8$ are made extremely small compared with the unity coefficient of $S^5$ and the five main eigen values are then practically the same as for the fifth order system, as required to apply the criterion, and the remaining 3 eigen values are so remote from the frequency range of interest that they do not significantly affect the application of the criterion.

Similar remarks concerning the numerator function $1+b_1S+b_2S^2$ in Example V apply also to this application.

The choice of $b_1$ and $b_2$ will require to be somewhat different and suitable values for this fifth order case could be in the range $$\begin{cases} b_1 = 0.6 \text{ to } 1.5 \\ b_2 = 0.4 \text{ to } 1.2 \end{cases}$$

As in example V, the values of $b_1$ and $b_2$ having been chosen, they would be fixed by choice of $\tau_o$, $\tau_r$ and $\tau_d$ and correspondingly, by then controlling $\tau_o$, $a_1$, $a_2$, $a_3$, and $a_4$ adaptively, the desired dynamic performance would be maintained unchanging although the parameters of the heating valve control, the heat exchanger or the transducers may vary.

As the order of the system to be adaptively controlled increases, the design of the adaptive controller will generally need to be considered with greater care.

Figure 11:
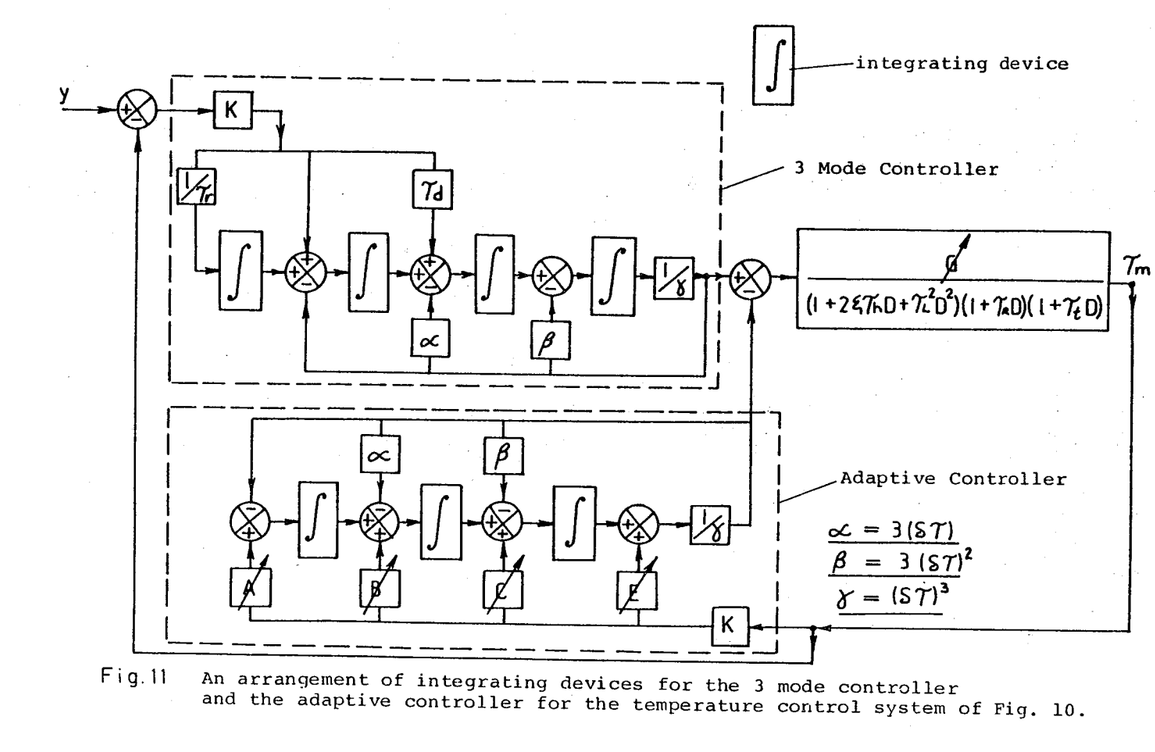
FIG. 11 shows an arrangement for integrating devices for the 3 mode controller and the adaptive controller for the temperature control system of FIG. 10.

FIG. 11 shows an arrangement of integrating devices that would be suitable for both the 3 mode controller and the adaptive controller for the fifth order temperature controlled system of FIG. 10.

In practice, the actual form of the integrating devices could take various mechanical, electrical (analogue or digital) forms depending upon the time scale of the dynamic system to be controlled, on the order of the system and hence the magnitudes of impulses.

Generally higher order systems could be expected to require devices capable of handling large impulses or very large numbers. In some cases for example this could require computers having what is known as 4 byte, 6 byte or even 8 byte numerical range.

The examples IV, V and VI explained above have all been what can be termed linearly deterministic systems. That is, systems which can be described more or less approximately in terms of explicit transfer function forms.

In many practical cases, however, the parameters of a system or process may be too uncertainly known to be explicitly formulated in a simple transfer function form. Even so such systems can often be described in terms of dominant eigen values. If so the techniques of this invention, and the criterion can be applied to such a system using, for example, the combination of a 3 mode controller and an adaptive controller of the form of FIG. 11 but with the number of suitable adaptive parameters A, B etc., determined from phase shift measurements on the non-deterministic system to determine an appropriate order of system that would approximate well enough the number of dominant eigen values involved.

Particular examples of the present invention have been described herein by way of example and it is envisaged that improvements and modifications to the invention can take place without departing from the scope of the appended claims.

What I do claim and desire to obtain by Letters Patent of the United States is:

1. An industrial control system having an adaptive control in which a control means compares at least one parameter of the control system with at least one predetermined value to produce an output signal to control each parameter and in which each parameter can be described mathematically as having dominant eign values and which utilize a rate of change of phase with frequency criterion under the following conitions:

$$\text{when } \phi = 0, \ (d\phi/d\omega)_{\omega \to 0} = \frac{C_1}{C_0} \quad (1)$$

when $\phi = \pi/2, 3\pi/2, S\,\pi/2 \ldots$ $$\text{when } A = 0, M = \frac{1}{B} \text{ and } (d\phi/d\omega) = \frac{-\left(\frac{dA}{d\omega}\right)}{B} \quad (2)$$

when $\phi = \pi, 2\pi, 3\pi \ldots$ $$\text{then } B = 0, M = \frac{1}{A} \text{ and } (d\phi/d\omega) = \frac{\frac{dB}{d\omega}}{A} \quad (3)$$

and (1), (2) and (3) are equal and where the transfer function corresponding to the linear differential equation is expressed as $$\frac{z}{y} = \frac{1}{A + jB}$$

where j is the complex operator $\sqrt{-1}$ and $$A = C_o - C_2\omega^2 + C_4\omega^4 - C_6\omega^6 + \ldots$$

$$B = C_1\omega^1 - C_3\omega^3 + C_5\omega^5 - C_7\omega^1 + \ldots$$

and $\omega$ is the angular frequency in radians per second; $\phi$ the phase lag of z relative to y and the modulus $M = |z/y|$ are given by $$\phi = \tan^{-1}\left(\frac{B}{A}\right) \text{ and } M = \frac{1}{\sqrt{A^2 + B^2}}$$

said industrial control system further comprising a memory means having stored therein the values for at least one control parameter based on a rate of change of phase with frequency criterion; means for measuring the current value of each control parameter; and means for comparing a stored control parameter with the current value of each parameter to produce an output signal, and means, responsive to said output signal, for controlling the industrial system to produce a desired optimum performance thereof.

2. An industrial adaptive control system as claimed in claim 1, wherein the control parameters are changed to a new set of parameters which are in accord with the eigen values of the rate of change of phase criterion.

3. An industrial adaptive control system as claimed in claim 2, wherein the method of manufacture is described mathematically by a characteristic linear differential equation of any order n, or as having any number of n eigen values.

4. An industrial adaptive control system as claimed in claim 1, wherein the industrial control system includes a weighing means for measuring the weight of articles.

5. An industrial adaptive control system as claimed in claim 1, wherein the industrial control system includes and controls at least one robot for transporting articles with differing weights.

6. An industrial adaptive control system as claimed in claim 1, wherein the industrial control system includes and controls at least one conveyor for transporting differing numbers of articles.

7. An industrial adaptive control system as claimed in claim 1, wherein the industrial control system includes at least one dryer the temperature of which is controlled by the system.

8. An industrial adaptive control system as claimed in claim 1, wherein the industrial control system controls a variable inertia load.

* * * * *